US008693693B2

(12) United States Patent  
Inokuchi et al.

(10) Patent No.: US 8,693,693 B2  
(45) Date of Patent: Apr. 8, 2014

(54) INFORMATION PROCESSING APPARATUS, CONTENT PROVIDING SYSTEM, INFORMATION PROCESSING METHOD, AND COMPUTER PROGRAM

(75) Inventors: Tatsuya Inokuchi, Tokyo (JP); Takahisa Ohgami, Tokyo (JP); Kazuyoshi Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1455 days.

(21) Appl. No.: 12/135,503

(22) Filed: Jun. 9, 2008

(65) Prior Publication Data

US 2009/0022324 A1 Jan. 22, 2009

(30) Foreign Application Priority Data

Jul. 17, 2007 (JP) ................................. 2007-185420

(51) Int. Cl.  
*G06F 21/00* (2013.01)

(52) U.S. Cl.  
USPC .......................................................... 380/279

(58) Field of Classification Search  
USPC .......................................................... 380/279  
See application file for complete search history.

(56) References Cited

U.S. PATENT DOCUMENTS

| 6,816,596 | B1 * | 11/2004 | Peinado et al. ............... 380/277 |
| 2007/0174362 | A1 * | 7/2007 | Pham et al. .................... 707/204 |

FOREIGN PATENT DOCUMENTS

| JP | 10-293707 | 11/1998 |
| JP | 2002-189481 | 7/2002 |
| JP | 2003-22337 | 1/2003 |
| JP | 2003-173394 | 6/2003 |
| JP | 2008-181428 | 8/2008 |

OTHER PUBLICATIONS

Hitoshi Kamei, et al. Design of Unified Namespace File System for Distributed Computer Networks, Realization of the identifier environment unification mechanism of the calculation-machine group in the distributed environment, Institute of Electronics, Information and Communication Engineers Technical Report, vol. 103, No. 605, Jan. 28, 2004, pp. 55-60 and cover pages.

* cited by examiner

*Primary Examiner* — Kambiz Zand  
*Assistant Examiner* — Ali Shayanfar  
(74) *Attorney, Agent, or Firm* — Oblon, Spivak, McClelland, Maier & Neustadt, L.L.P.

(57) ABSTRACT

Disclosed herein is an information processing apparatus that serves as a server that performs data transmission in response to receipt of media information from a user device. The information processing apparatus includes: an encrypted transmission data storage database that stores a transmission data identifier and encrypted transmission data such that the transmission data identifier and the encrypted transmission data are associated with each other; and a control section configured to acquire, from a key management server, an encrypted unit key obtained by encrypting a unit key that is used to encrypt the transmission data, and transmit the acquired encrypted unit key and the encrypted transmission data to the user device.

17 Claims, 12 Drawing Sheets

| TRANSMISSION DATA ID (TRAILER ID) | UNIT KET (TITLE KEY) |
|---|---|
| TRANSMISSION DATA ID1 (TRAILER ID1) | Kt1 |
| TRANSMISSION DATA ID2 (TRAILER ID2) | Kt2 |
| TRANSMISSION DATA ID3 (TRAILER ID3) | Kt3 |
| ·· | ·· |
| TRANSMISSION DATA IDn (TRAILER IDn) | Ktn |

313
TRANSMISSION DATA-USE CRYPTOGRAPHIC KEY DATABASE

| TRANSMISSION DATA ID (TRAILER ID) | ENCRYPTED TRANSMISSION DATA (ENCRYPTED TRAILER) |
|---|---|
| TRANSMISSION DATA ID1 (TRAILER ID1) | $Enc(Kt1, DATA\ 1)$ |
| TRANSMISSION DATA ID2 (TRAILER ID2) | $Enc(Kt2, DATA\ 2)$ |
| TRANSMISSION DATA ID3 (TRAILER ID3) | $Enc(Kt3, DATA\ 3)$ |
| ... | ... |
| TRANSMISSION DATA IDn (TRAILER IDn) | $Enc(Ktn, DATA\ n)$ |

352 ENCRYPTED TRANSMISSION DATA STORAGE DATABASE

INFORMATION PROCESSING APPARATUS, CONTENT PROVIDING SYSTEM, INFORMATION PROCESSING METHOD, AND COMPUTER PROGRAM

CROSS REFERENCES TO RELATED APPLICATIONS

The present invention contains subject matter related to Japanese Patent Application JP 2007-185420 filed in the Japan Patent Office on Jul. 17, 2007, the entire contents of which being incorporated herein by reference.

BACKGROUND OF THE INVENTION

1. Field of the Invention

The present invention relates to an information processing apparatus, a content providing system, an information processing method, and a computer program. In particular, the present invention relates to an information processing apparatus, a content providing system, an information processing method, and a computer program which perform data transmission via a network.

2. Description of the Related Art

DVDs are widely used as storage media with a large storage capacity. The DVDs are uses to store movie contents, for example. Blu-ray Discs (Registered Trademark of Sony Corporation), which use a blue laser, are an example of media with a greater storage capacity. The Blu-ray Disc (Registered Trademark of Sony Corporation) is capable of high-density recording, and of storing digital data of a large-size video content or the like with a high image quality.

A BD-ROM is a Blu-ray Disc (Registered Trademark of Sony Corporation) of the ROM type. BD-ROMs that store high-definition contents or the like have already been prevalent on the market. A user can mount such a medium storing a content on a playback apparatus, such as a personal computer (PC) or a disk player, to play the content. Rights to distribute music data, image data, and various other types of contents are generally owned by creators or distributors thereof. Accordingly, control, such as encryption, is placed on the contents when they are distributed, whereby some restrictions are placed on the use of the contents. Thus, the use of the contents is permitted for only authorized users, and unauthorized copying of the contents is prevented, for example.

Content using systems have been proposed that download, as subsequent data, additional data for a content recorded on a medium such as a DVD from a server, store the additional data in a storage unit such as a hard disk in a playback device such as the PC, and play the additional data in conjunction with the content recorded on the medium. Examples of such additional data include: subtitle data or dubbing data for a movie content; and service data or video or still image contents for other types of contents. Such content using systems are disclosed in Japanese Patent Laid-Open No. 2003-30157 and Japanese Patent Laid-Open No. 2001-126385, for example.

Features of a playback apparatus that plays the BD-ROM include a Java (registered trademark) execution environment called BD-J, a feature of connectivity to a server via a network using Java (registered trademark), and a feature of generating a single file system by integrating the subsequent data acquired from the server and stored in the hard disk, for example, with the content recorded on the disk for playback. The single file system generated by integrating the subsequent data with the content recorded on the disk is called a virtual file system (VFS). A playback process based on the VFS enables playback in a manner similar to that of a process of playing data on a single medium.

Use of the above features by executing a BD-J program supplied via a disk or a network achieves various processes, including the following processes:

(1) Acquiring a new AV content from a server and adding it;

(2) Changing an AV content on the disk by, for example, acquiring from a server a replacement content corresponding to the AV content on the disk; and (3) Changing navigation corresponding to the content stored in the disk by acquiring, from a server, menu information, playback sequence information, or the like.

The Advanced Access Content System (AACS) is a standard for copyright protection of contents. The AACS defines a copyright protection technology based on a sophisticated common key cryptography (AES encryption). The AACS is described in AACS Common Book, Revision 0.91 AACS Recordable Video Book, Revision 0.91 (http://www.aacsla.com/specifications/specs091/AACS_Spec_Common_0.91.pdf) and AACS Blu-ray Disc prerecorded Book (http://www.aacsla.com/specifications/AACS_Spec_BD_Prerecorded_0.912.pdf), for example. The AACS provides specifications concerning encryption of the contents and use of cryptographic keys. In particular, the AACS specifies that different cryptographic keys should be used for different disk titles (e.g., movie titles), in order to improve security against leakage of the cryptographic keys, for example.

Examples of the subsequent data provided by the server include a movie advertising content called a trailer and service data. Some of such subsequent data are shared data to be provided for various titles of disk-stored contents to be provided to users. As described above, the AACS specifies that different cryptographic keys need be used for different disk titles, and accordingly the server that provides the subsequent data needs to encrypt the subsequent data with a cryptographic key corresponding to the disk title (e.g., movie title) owned by the user, and provide the encrypted subsequent data to the user. Therefore, when the number of titles for which the same subsequent data is to be provided is large, the server needs to generate or store a large number of different pieces of encrypted subsequent data for the same subsequent data, resulting in inefficient processing.

SUMMARY OF THE INVENTION

The present invention addresses the above-identified, and other problems associated with existing methods and apparatuses, and provides an information processing apparatus, a content providing system, an information processing method, and a computer program which make it possible to reduce a processing load of the server that provides the subsequent data to achieve efficient management and delivery of the subsequent data.

According to one embodiment of the present invention, there is provided an information processing apparatus that serves as a server that performs data transmission in response to receipt of media information from a user device, the apparatus including: an encrypted transmission data storage database that stores a transmission data identifier and encrypted transmission data such that the transmission data identifier and the encrypted transmission data are associated with each other; and a control section configured to acquire, from a key management server, an encrypted unit key obtained by encrypting a unit key that is used to encrypt the transmission data, and transmit the acquired encrypted unit key and the encrypted transmission data to the user device.

According to another embodiment of the present invention, there is provided a content providing system including: a user device configured to transmit media information to a service server, and receive transmission data from the service server; the service server configured to transmit the transmission data in response to receipt of the media information from the user device; and a key management server configured to manage a unit key that is used to encrypt the transmission data. The service server receives the media information from the user device, and transmits the media information and a transmission data identifier to the key management server.

The key management server encrypts a unit key stored so as to be associated with the transmission data identifier with a cryptographic key stored so as to be associated with the media information, and transmits the generated encrypted unit key to the service server. The service server transmits the encrypted unit key acquired from the key management server and the encrypted transmission data to the user device.

According to yet another embodiment of the present invention, there is provided an information processing method employed by an information processing apparatus that serves as a server that transmits transmission data in response to receipt of media information from a user device, the method including the steps of: a) in response to the receipt of the media information from the user device, a control section acquiring, from a key management server, an encrypted unit key obtained by encrypting a unit key that is used to encrypt the transmission data; and b) the control section acquiring, from an encrypted transmission data storage database that stores a transmission data identifier and the encrypted transmission data such that the transmission data identifier and the encrypted transmission data are associated with each other, the encrypted transmission data, and transmitting the acquired encrypted unit key and the encrypted transmission data to the user device.

According to yet another embodiment of the present invention, there is provided a computer program that causes an information processing apparatus that serves as a server that transmits transmission data in response to receipt of media information from a user device to perform information processing, the program causing the information processing apparatus to perform the steps of: in response to the receipt of the media information from the user device, causing a control section to acquire, from a key management server, an encrypted unit key obtained by encrypting a unit key that is used to encrypt the transmission data; and causing the control section to acquire, from an encrypted transmission data storage database that stores a transmission data identifier and the encrypted transmission data such that the transmission data identifier and the encrypted transmission data are associated with each other, the encrypted transmission data, and transmit the acquired encrypted unit key and the encrypted transmission data to the user device.

The computer program according to this embodiment of the present invention is, for example, a computer program that can be provided to a general-purpose computer system capable of executing various program codes via a storage medium or a communication medium that provides the computer program in computer-readable form. When such a program is provided to the computer system in computer-readable form, the processes in accordance with the program can be accomplished on the computer system.

According to yet another embodiment of the present invention, there is provided an information processing apparatus that serves as a key delivery server that delivers a key to a service server that transmits transmission data in response to receipt of media information from a user device, the apparatus including: a cryptographic key database that stores the media information and a cryptographic key that is set for the media information such that the media information and the cryptographic key are associated with each other; a transmission data-use cryptographic key database that stores a transmission data identifier and a unit key such that the transmission data identifier and the unit key are associated with each other; and a control section configured to acquire, from the cryptographic key database, the cryptographic key that is set for the media information and associated with the media information received from the service server, acquire the unit key associated with the transmission data identifier received from the service server from the transmission data-use cryptographic key database, encrypt the acquired unit key with the cryptographic key that is set so as to be associated with the acquired media information, and transmit the encrypted unit key to the service server.

Other objects, features, and advantages of the present invention will become more apparent from the following detailed description of the present invention with reference to an embodiment of the present invention and the accompanying drawings.

According to one embodiment of the present invention, in a system in which the service server provides to the user device the transmission data corresponding to a medium mounted on the user device, the service server needs to store only one piece of encrypted transmission data, encrypted with a single CPS unit key (title key), for one type of transmission data. That is, the service server does not need to store, for the same transmission data, multiple pieces of encrypted transmission data, encrypted with different cryptographic keys for different titles corresponding to volume IDs, which are the media information. With respect to that type of transmission data, such as a trailer, advertising data, or service data, which does not correspond to a particular content title but is shared by multiple titles, it is possible to set the CPS unit key (title key) for the transmission data, store the encrypted transmission data, which is obtained by encrypting the transmission data with that CPS unit key (title key), and provide the encrypted transmission data to the user device. The service server does not need to generate and store multiple pieces of encrypted transmission data for the same transmission data by encrypting the transmission data with different cryptographic keys (CPS unit keys) for different titles. Thus, increased efficiency in processing and a reduction in storage space are achieved.

DETAILED DESCRIPTION OF THE PREFERRED EMBODIMENT

Hereinafter, details of an information processing method and a computer program according to an embodiment of the present invention will be described with reference to the accompanying drawings. Descriptions are presented in the following order:

1. Outline of recording and playback of content on medium in accordance with AACS specifications;
2. Outline of acquisition of subsequent data from server;
3. Processes according to one embodiment of the present invention; and
4. Structures of and processes by devices.

[1. Outline of Recording and Playback of Content on Medium in Accordance with AACS Specifications]

First, an outline of the recording and playback of a content on a medium in accordance with the AACS specifications will now be described below with reference to FIG. 1. As described above, the Advanced Access Content System (AACS) is a standard for the copyright protection of the contents, and provides specifications concerning encryption of the contents and use of cryptographic keys. Production and playback of a content-stored medium in accordance with the AACS specifications will now be described below with reference to FIG. 1.

Figure 1:
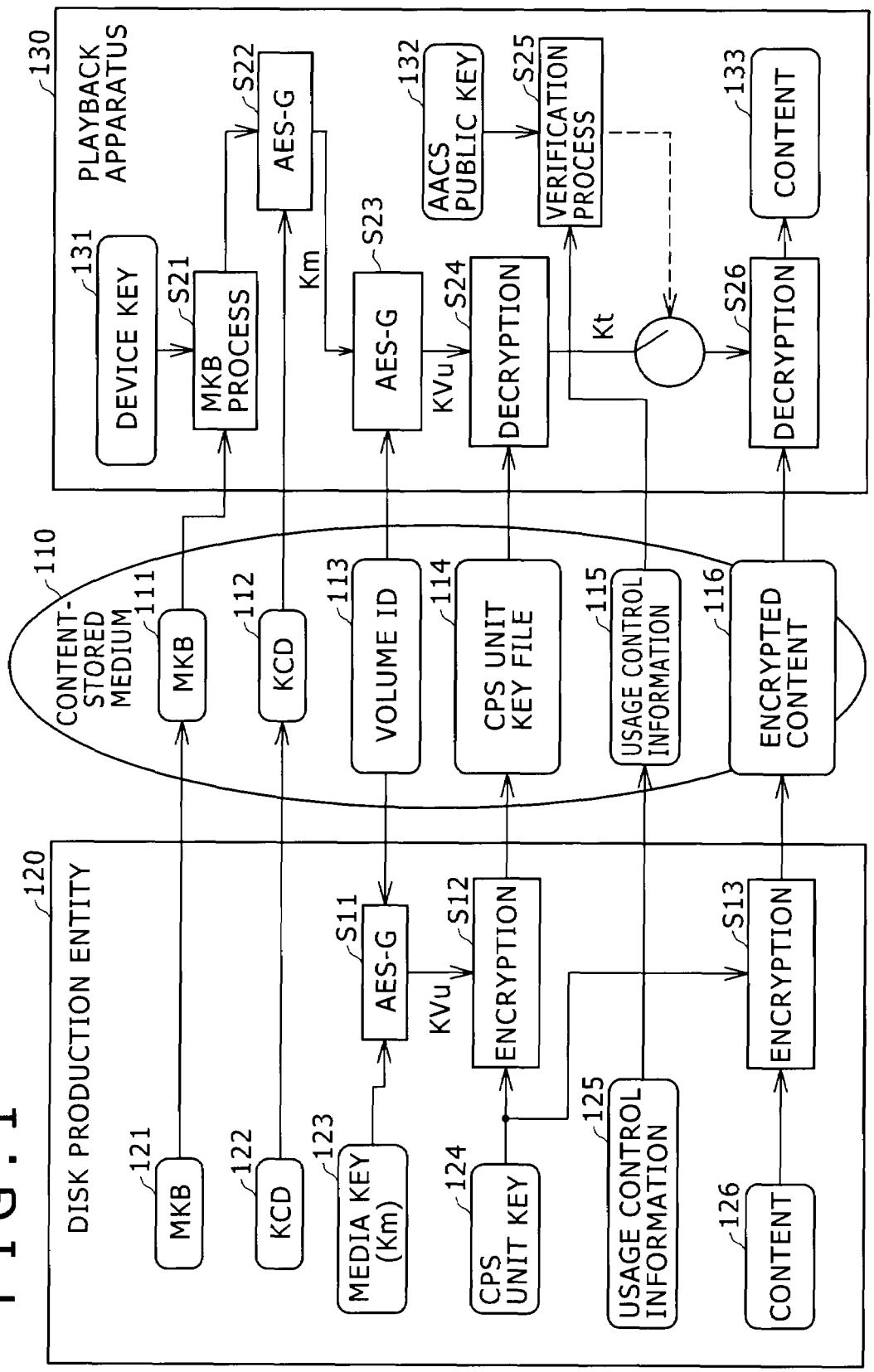
FIG. 1 is a diagram for describing an outline of recording and playback of a content on a medium in accordance with AACS specifications.

In FIG. 1, a medium (i.e., an information storage medium) shown in the middle is a content-stored medium 110 compliant with the AACS standard. Processes performed by a disk production entity 120, which produces the content-stored medium 110, are shown on the left-hand side of FIG. 1. Processes performed by a playback apparatus (i.e., a user device) 130, which plays the content stored in the content-stored medium 110, are shown on the right-hand side of FIG. 1.

First, the processes performed by the disk production entity 120 will be described below. The disk production entity 120 records a media key block (MKB) 121 and key conversion data (KCD) 122 on the medium 110. The media key block (MKB) 121 is a cryptographic information (i.e., cryptographic key) block that is generated based on a tree-structure key delivery scheme known as one mode of a broadcast encryption scheme. The MKB 121 is a cryptographic information block for allowing a media key [Km], which is necessary for decryption of the content, to be acquired only by data processing applying the KCD 122 and a device key [Kd] stored in an information processing apparatus of a user who has an effective license. That is, the MKB 121 stores the media key as secret information.

Thus, the MKB 121 allows the media key [Km] to be acquired only when the user device (i.e., the information processing apparatus) has the effective license, and prevents an invalidated (revoked) user device from acquiring the media key [Km]. That is, the MKB is a cryptographic information block for allowing the secret information to be acquired only when a device key delivered to a particular selected device is applied, while preventing the secret information from being acquired when a device key delivered to a revoked device, i.e., an excluded device, is applied.

By changing a set of keys used to encrypt the media key [Km] stored in the MKB, a control center as a license entity is capable of generating an MKB that may not be decrypted with a device key stored in a particular user device, i.e., that prevents the media key, which is necessary for the decryption of the content, from being acquired with that device key. This makes it possible to provide a decryptable encrypted content only to a device that has the effective license, while excluding (revoking) unauthorized devices at an arbitrary time.

In addition, the disk production entity 120 performs an encryption process (AES-G) at step S11 applying the media key [Km] 123 and a volume ID 113, which has been previously stored in the medium 110, to generate a volume unique key [KVu]. Note that AES-G denotes a key generation process that complies with Advanced Encryption Standard (AES) encryption processing. The volume ID is media information that is set as an identifier for a certain collection of media (volume). For example, the volume ID as the media information is an identifier specific to each disk title (e.g., movie title). The volume unique key is set as a unique key associated with the volume ID set for the certain collection of media (volume).

Further, the disk production entity 120 encrypts a CPS unit key 124 at step S12 with the volume unique key [KVu] to generate a CPS unit key file 114, which is to be stored in the medium 110. Thus, the CPS unit key to be stored in the medium 110 is data encrypted with the volume unique key [KVu]. The CPS unit key will be used by the playback apparatus when decrypting the content. Note that the CPS unit key will be referred to also as a "title key [Kt]."

Still further, the disk production entity 120 records, on the medium 110, usage control information 125 corresponding to the content stored in the medium 110. In the usage control information 125, usage control information corresponding to the content stored in the medium, such as information concerning copy regulations or information concerning external output regulations, is stored, for example.

The disk production entity 120 encrypts a content 126 at step S13 with the CPS unit key (title key) 124, and records the encrypted content on the medium 110.

As a result of the above processes, an MKB 111, a KCD 112, the volume ID 113, the CPS unit key file 114, usage control information 115, and an encrypted content 116 are stored in the content-stored medium 110 as shown in FIG. 1.

The content-stored medium 110, in which the above pieces of data are stored, is mounted on the playback apparatus 130 as the user device, and the content stored therein is played by the playback apparatus 130 after key generation in accordance with a predetermined sequence and content decryption, and so on. The processes performed by the playback apparatus 130 will now be described below.

The playback apparatus 130 is an AACS-compliant device, and has a device key [Kd] 131 stored in its own memory. First, the playback apparatus 130 reads the MKB 111 and the KCD 112 stored in the medium 110, and, at steps S21 and S22, performs an MKB process and an encryption process (AES-G) applying the device key 131 stored in its own memory to acquire the media key [Km].

Further, at step S23, the playback apparatus 130 reads the volume ID 113 stored in the medium 110, and performs an encryption process (AES-G) thereon applying the media key [Km] to generate the volume unique key [KVu].

Still further, at step S24, the playback apparatus 130 reads the CPS unit key file 114 stored in the medium 110, and performs a decryption process thereon applying the volume unique key [KVu] to generate the CPS unit key (title key) [Kt].

Still further, at step S25, the playback apparatus 130 reads the usage control information 115 stored in the medium 110, and performs a verification process (e.g., signature verification) on the usage control information 115 applying an AACS public key stored in the memory in the playback apparatus to determine whether the usage control information is valid. Use of the content is permitted in accordance with a description in the usage control information that has been determined to be valid.

Thereafter, at step S26, the playback apparatus 130 decrypts the encrypted content 116 stored in the medium 110 with the CPS unit key (title key) [Kt] to play a content 133.

As described above, according to the AACS specifications, the playback apparatus 130 needs to perform the key generation and the content decryption in accordance with the AACS specifications when using the content stored in the medium. This makes it possible to prevent unauthorized use of the content with an unauthorized playback apparatus.

[2. Outline of Acquisition of Subsequent Data from Server]

As described above, features of the playback apparatus that plays the AACS-compliant medium, such as a BD-ROM, include a Java (registered trademark) execution environment called BD-J, a feature of connectivity to a server via a network using Java (registered trademark), and a feature of generating a single file system by integrating subsequent data acquired from the server and stored in a hard disk, for example, with the content recorded on the disk for playback. The single file system generated by integrating the subsequent data with the content recorded on the disk is called a virtual file system (VFS). A playback process based on the VFS enables playback in a manner similar to that of a process of playing data on a single medium.

Figure 2:
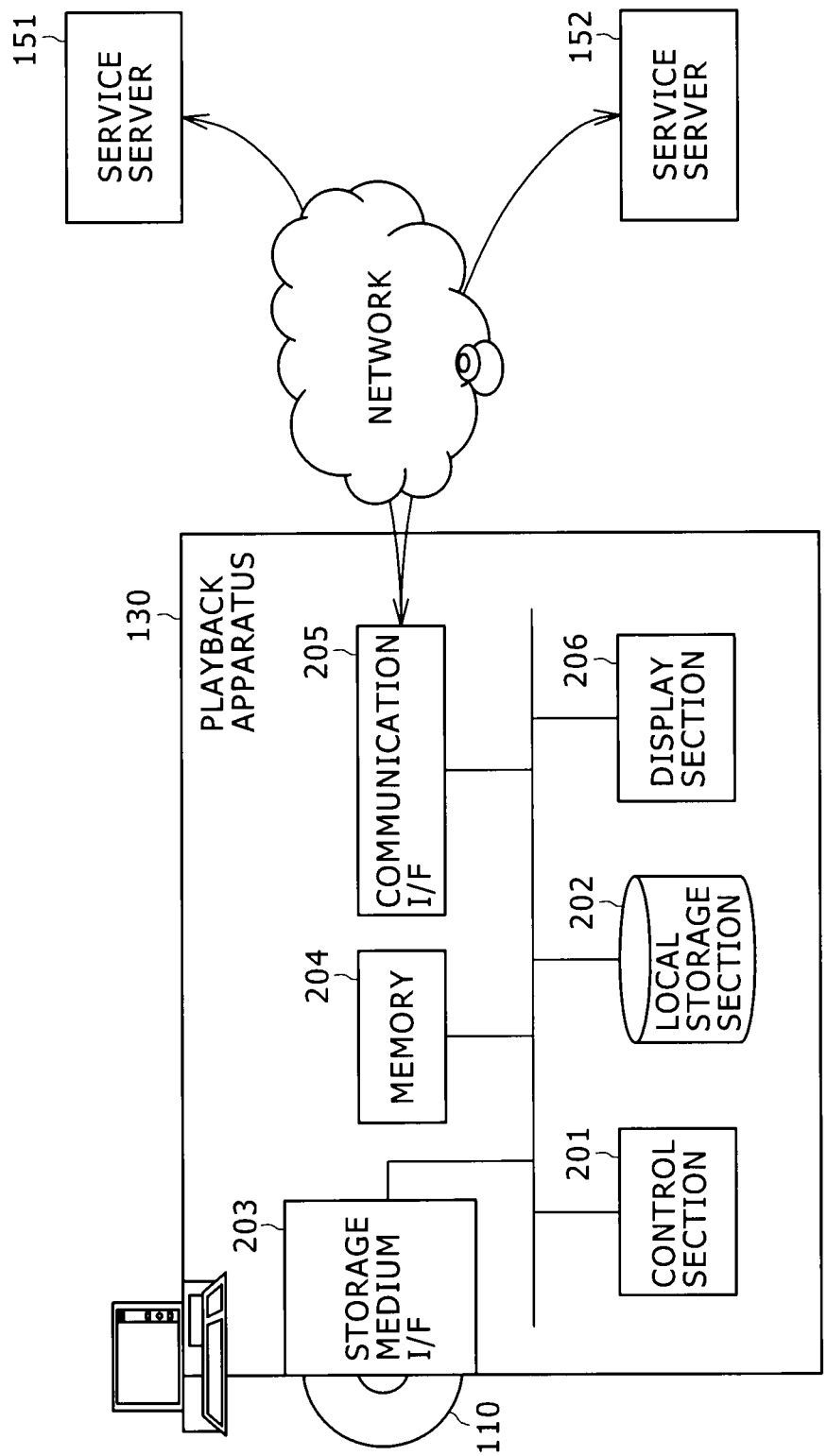
FIG. 2 is a diagram for describing an outline of acquisition of subsequent data from a server.

An outline of the acquisition of the subsequent data from the server will now be described below with reference to FIG. 2. FIG. 2 shows the playback apparatus 130, such as a PC or a media playback apparatus, that performs a process of playing the medium (i.e., the information storage medium) 110, such as a DVD or a Blu-ray Disc (Registered Trademark of Sony Corporation), for example.

The playback apparatus 130 includes a control section 201, a local storage section 202, a storage medium interface 203, a memory 204, a communication interface 205, and a display section 206.

The control section 201 is a CPU or the like that has a capability to execute a program to perform a content playback process, a subsequent data management process, and so on.

The local storage section 202 stores the subsequent data corresponding to the content stored in the medium 110. Examples of the subsequent data include data downloaded from a service server 151 or 152 and data generated by the user.

The storage medium interface 203 inputs and outputs data to or from the medium 110.

The memory 204 is formed by a ROM or RAM used as an area where the program is executed, an area where a parameter is stored, and so on.

The communication interface 205 performs communication via the network.

The display section 206 displays the content or content information.

The local storage section 202 is formed by a hard disk or a flash memory, for example.

The playback apparatus 130 reads the content from the medium 110 via the storage medium interface 203, and performs the key generation, the decryption process, and so on according to the sequence as described above with reference to FIG. 1 to play the content. These processes are performed under control of the control section 201.

The playback apparatus 130 acquires, from the service server 151 or 152, a subcontent that can be used in conjunction with the playback of the content stored in the medium 110, e.g., advertising information concerning a content that is to be published next, service data, etc. (also called a trailer). The playback apparatus 130 stores the acquired subcontent in the local storage section 202, which is formed by the hard disk or the flash memory, for example.

The subsequent data stored in the local storage section 202 is data that has been acquired or generated correspondingly to the content stored in the medium 110. It is possible to play the subsequent data stored in the local storage section 202 in conjunction with the playback of the content stored in the medium 110. This playback process is performed while the virtual file system (VFS) is constructed by integrating the disk-stored content with the content stored in the local storage section, such as the hard disk, for example. The playback process based on the VFS enables playback in a manner similar to that of the process of playing data on a single medium.

Note that, when storing the subsequent data, the control section 201 generates or updates management information and description information relating to the subsequent data and stores the generated or updated management information and description information in the local storage section 202 as necessary. The control section 201 stores the subsequent data and the management information and the description information in a directory for the subsequent data as prepared in the local storage section 202.

As noted previously, by acquiring the subsequent data from the service server 151 or 152, the playback apparatus 130 is capable of performing various processes, including the following processes:

(1) Acquiring a new AV content from the server and adding it;

(2) Changing the AV content on the disk by, for example, acquiring from the server a replacement content corresponding to the AV content on the disk; and (3) Changing navigation corresponding to the content stored in the disk by acquiring, from the server, menu information, playback sequence information, or the like.

The subsequent data provided by the server may be shared subsequent data to be provided for various titles of disk-stored contents owned by the user, such as a movie advertising content or the service data. As described above, the AACS specifies that different cryptographic keys should be used for different disk titles (e.g., movie titles), and accordingly the server that provides the subsequent data needs to encrypt the subsequent data with a cryptographic key corresponding to the disk title (e.g., movie title) owned by the user, and provide the encrypted subsequent data to the user. Therefore, when the number of titles for which the same subsequent data is to be provided is large, the server needs to generate or store a large number of different pieces of encrypted subsequent data for the same subsequent data, which have been generated with different cryptographic keys applied for different titles. This results in inefficient processing.

[3. Processes According to one Embodiment of the Present Invention]

Figure 3:
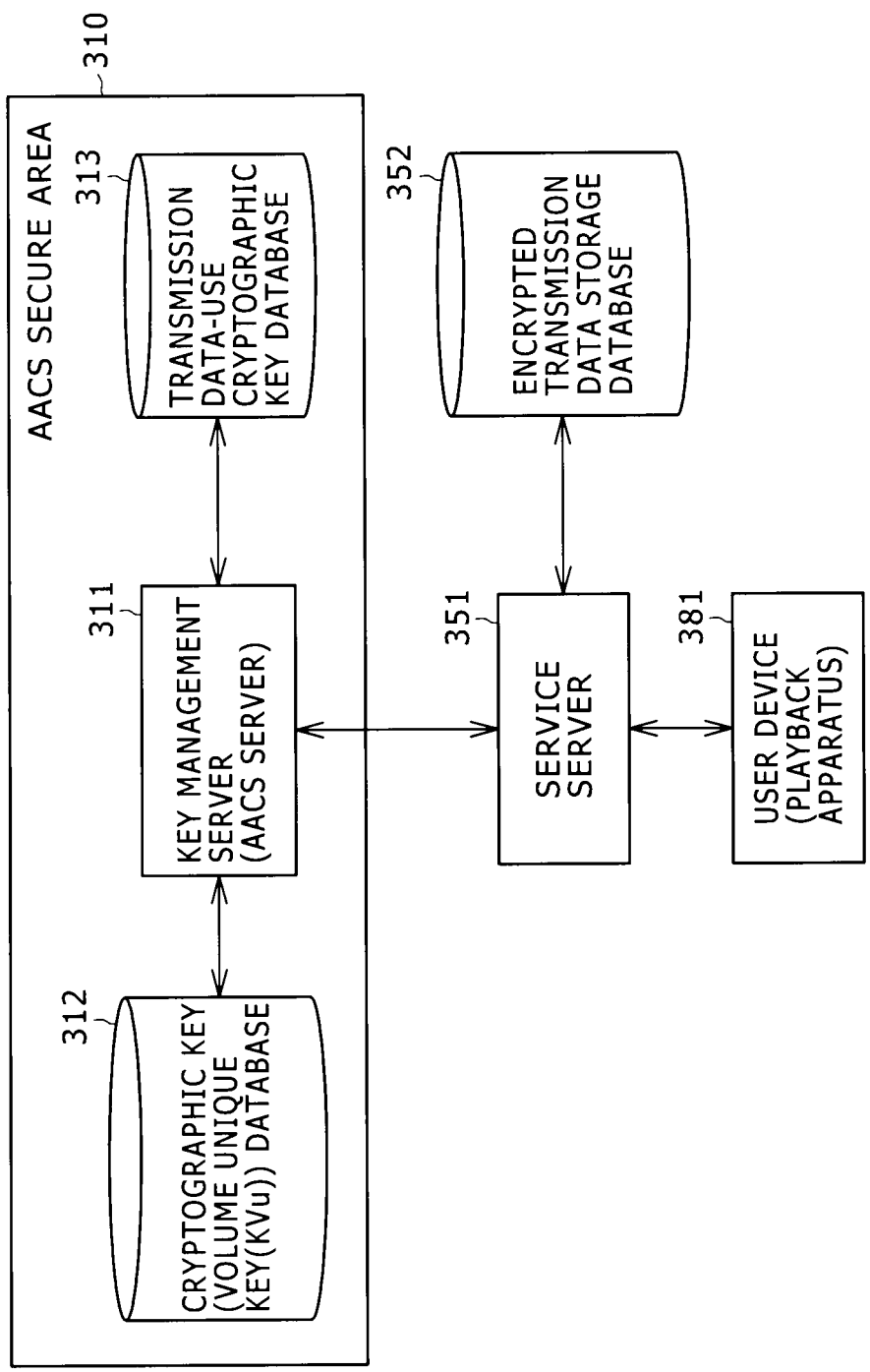
FIG. 3 is a diagram for describing the structure of and processes by a content providing system according to one embodiment of the present invention.

The present invention has been devised to solve the problem above. Processes according to one embodiment of the present invention will now be described below with reference to FIGS. 3, 4, 5, 6, 7, 8, 9, 10, 11, and 12. FIG. 3 shows a service server 351, a user device (playback apparatus) 381, and a key management server (AACS server) 311. The service server 351 provides the subsequent data, such as an advertising content called a trailer or the service data. The user device (playback apparatus) 381 acquires the subsequent data from the service server 351. The key management server (AACS server) 311 performs a management process in a content providing system in accordance with the AACS specifications, and performs a process of providing a key to be applied in encryption, for example.

The key management server (AACS server) 311, a cryptographic key database 312, and a transmission data-use cryptographic key database 313 are provided in an AACS secure area 310, where information leakage is prevented. The volume unique key (Kvu) is registered in the cryptographic key database 312. A cryptographic key (transmission data-use cryptographic key) to be applied when encrypting transmission data, such as the trailer, to be transmitted by the service server 351 to the user device is stored in the transmission data-use cryptographic key database 313.

Figure 4:
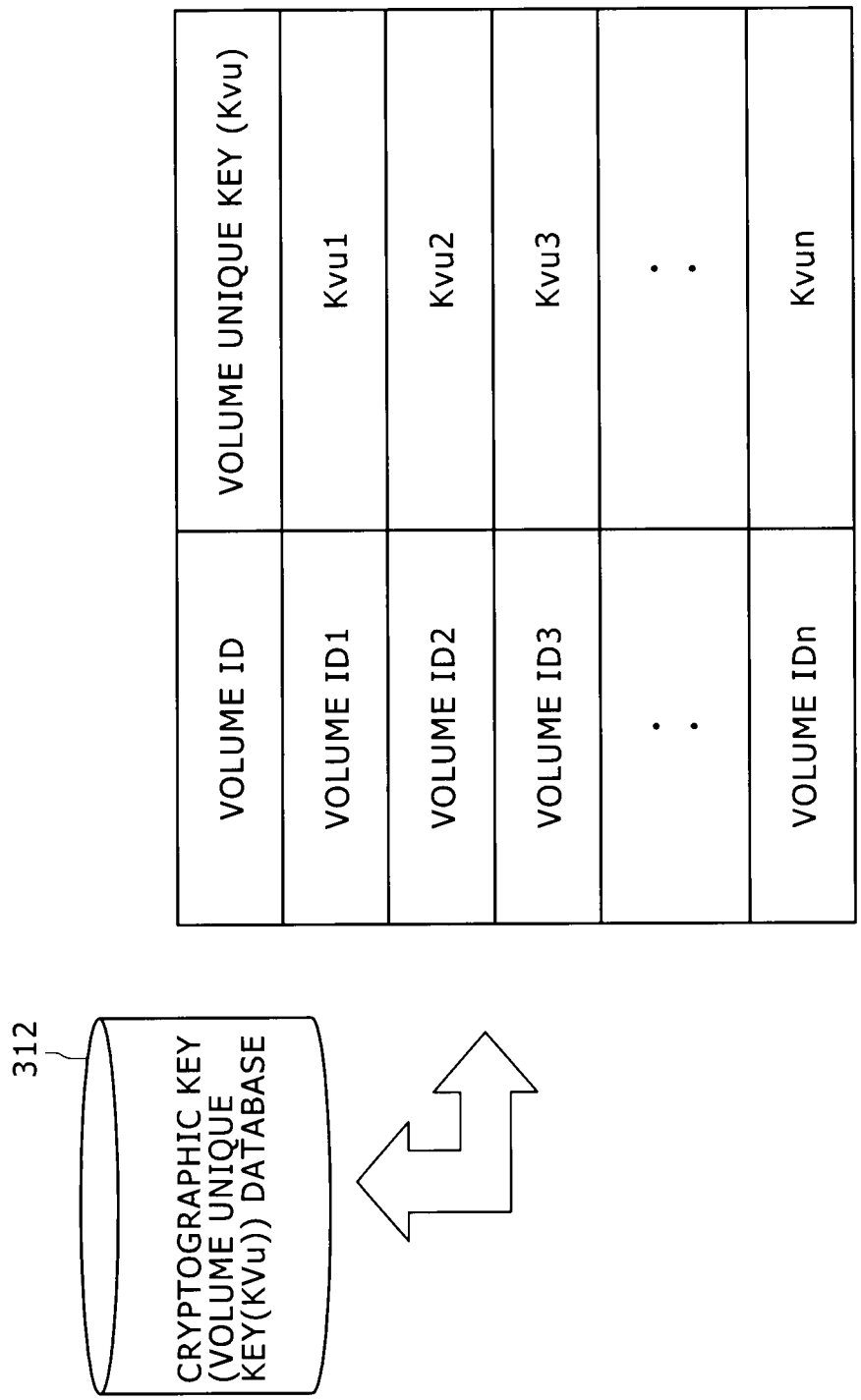
FIG. 4 is a diagram for describing an exemplary structure of data stored in a cryptographic key database.

FIG. 4 shows an exemplary structure of data stored in the cryptographic key database 312. As shown in FIG. 4, the cryptographic key database 312 stores the volume IDs and the volume unique keys [Kvu] associated with the volume IDs. As described above with reference to FIG. 1, the volume ID is set as an identifier for a certain collection of media (volume), while the volume unique key is set as a unique key associated with the volume ID set for the certain collection of media (volume).

Figure 5:
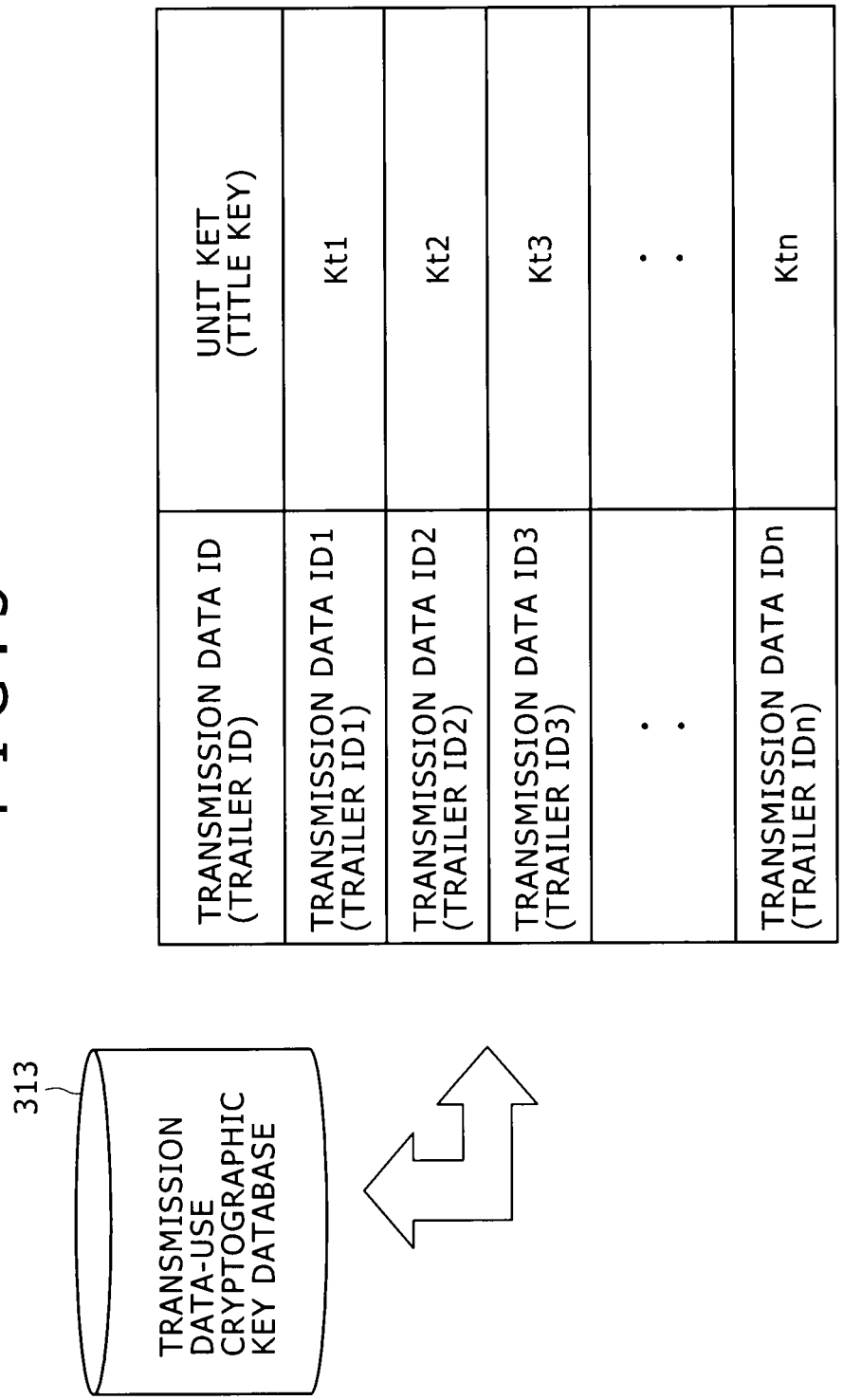
FIG. 5 is a diagram for describing an exemplary structure of data stored in a transmission data-use cryptographic key database.

FIG. 5 shows an exemplary structure of data stored in the transmission data-use cryptographic key database 313. As shown in FIG. 5, the transmission data-use cryptographic key database 313 stores transmission data IDs (trailer IDs) and the CPS unit keys (title keys) [Kt]. The transmission data IDs (trailer IDs) are identifiers for the transmission data, such as the trailers, to be transmitted by the service server 351 to the user device. The CPS unit keys (title keys) [Kt] are set so as to be associated with the transmission data IDs (trailer IDs).

The transmission data-use cryptographic key database 313 is updated as necessary. Specifically, when the service server 351 has generated new transmission data, such as new service data, the service server 351 transmits the generated transmission data and a key generation request to the key management server (AACS server) 311. Upon receipt of the key generation request, the key management server (AACS server) 311 sets an identifier (ID) for that transmission data as a transmission data identifier, and generates a CPS unit key (title key) [Kt] for that transmission data ID and registers it in the transmission data-use cryptographic key database 313. Note that the CPS unit key (title key) [Kt] is associated with a CPS unit identifier, which is identification information for a CPS unit.

The key management server (AACS server) 311 encrypts the transmission data with the generated CPS unit key (title key) [Kt], and transmits the encrypted transmission data and the transmission data identifier (transmission data ID) to the service server 351.

Figure 6:
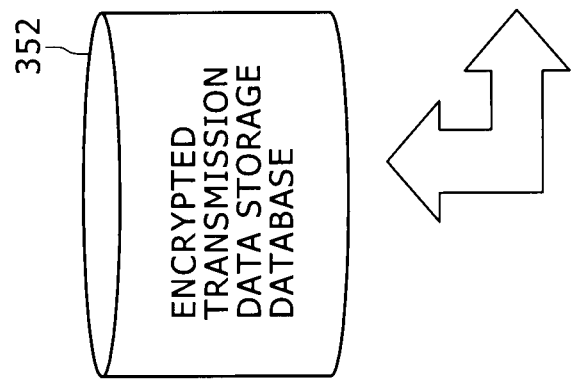
FIG. 6 is a diagram for describing an exemplary structure of data stored in an encrypted transmission data storage database.
Figure 7:
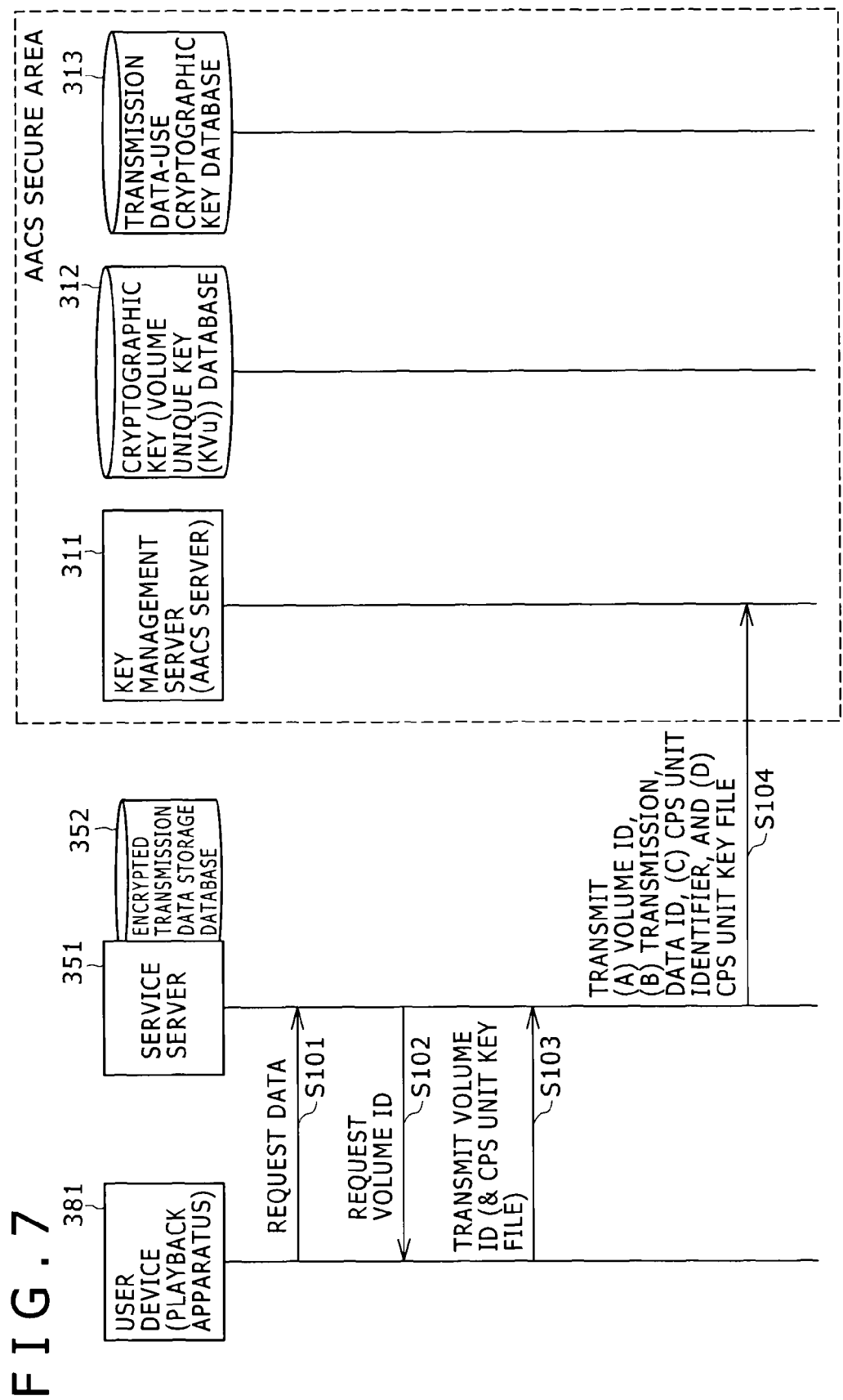
FIGS. 7 to 10 are diagrams for describing a sequence of communication performed when data is transmitted to a user device in the content providing system according to one embodiment of the present invention.
Figure 8:
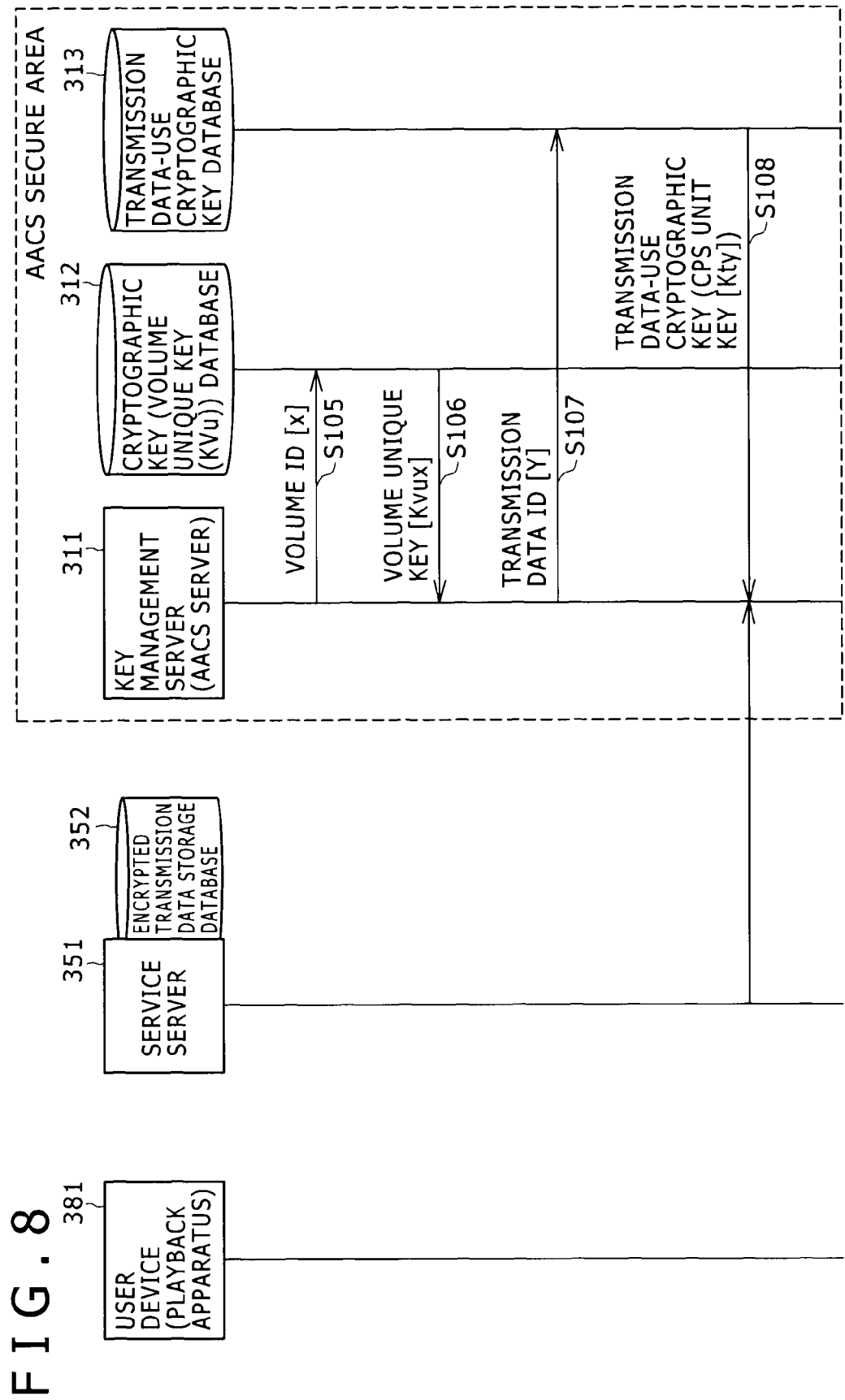
Figure 9:
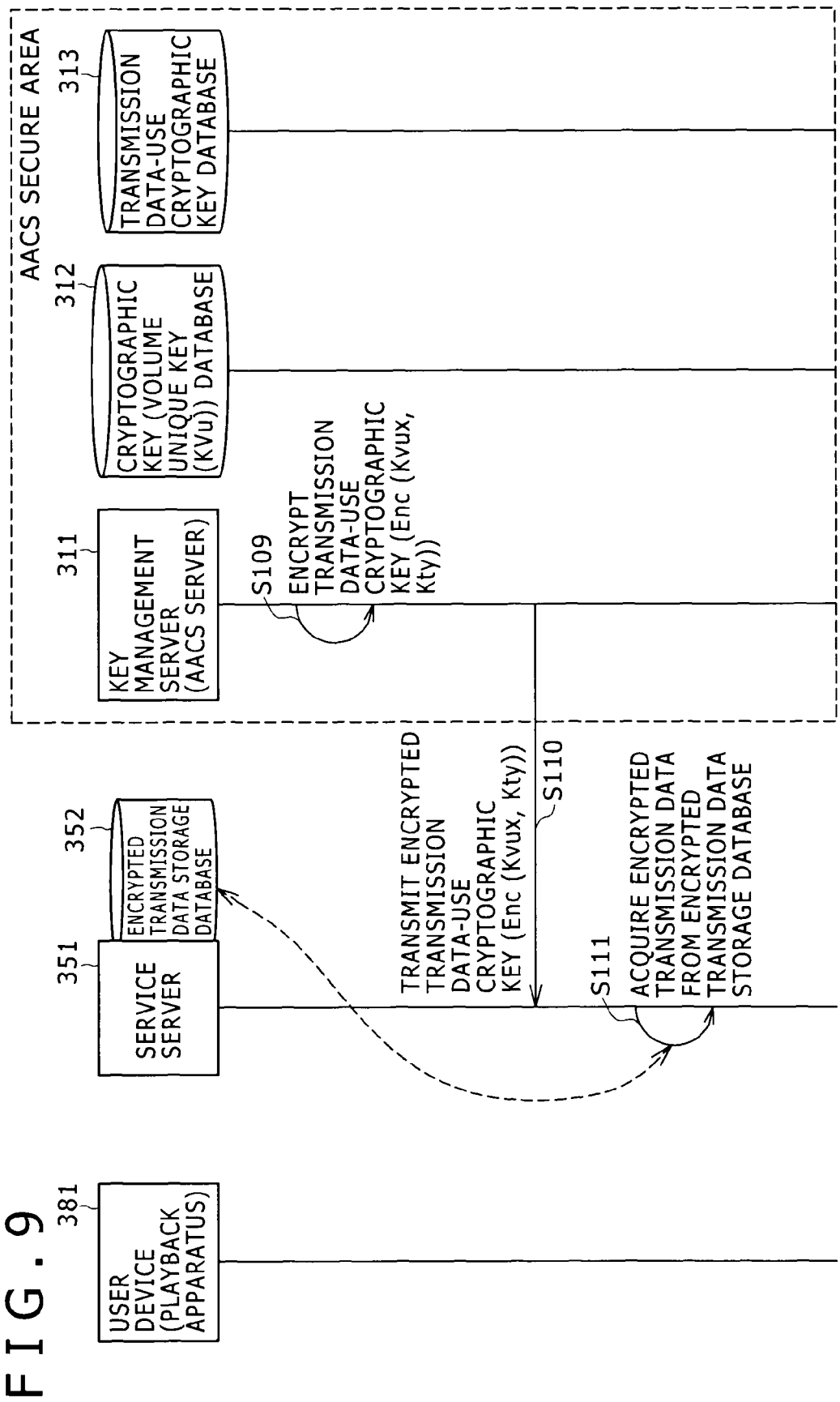

The service server 351 receives the transmission data identifier (transmission data ID) and the encrypted transmission data from the key management server (AACS server) 311, and stores them in an encrypted transmission data storage database 352. FIG. 6 shows an exemplary structure of data stored in the encrypted transmission data storage database 352.

As shown in FIG. 6, the encrypted transmission data storage database 352 is a database in which the transmission data identifiers (transmission data IDs) and the encrypted transmission data associated therewith are stored. The service server 351 transmits the encrypted transmission data to the user device (playback apparatus) 381.

According to the above-described structure as shown in FIG. 3, for one type of transmission data, only one piece of encrypted transmission data obtained by encrypting the transmission data with one cryptographic key, i.e., one CPS unit key (title key) [Kt], is stored in the service server 351, which provides the transmission data such as the trailer. That is, different keys are not used when encrypting the same transmission data for different titles as defined in the AACS specifications. According to the AACS specifications, the transmission data should be encrypted with a different key for a different title, and multiple pieces of encrypted transmission data need to be generated and stored for the same transmission data. In contrast, the present embodiment achieves a simpler arrangement. That is, as shown in FIG. 6, only one piece of encrypted transmission data, encrypted with a single key, needs to be stored in the encrypted transmission data storage database 352 for one type of transmission data.

A sequence of communication when a process of transmitting the subsequent data, such as the trailer, is performed according to the content providing system and database structures as described above with reference to FIGS. 3 to 6 will now be described below with reference to FIGS. 7 to 10. In FIGS. 7 to 10, participating parties are horizontally arranged in the following order (from left to right): the user device (playback apparatus) 381, which receives the transmission data, such as the trailer, from the service server 351; the service server 351, which provides the transmission data, such as the trailer, and the encrypted transmission data storage database 352, which is managed by the service server 351; the key management server (AACS server) 311; the cryptographic key (volume unique key (Kvu)) database 312, which is managed by the key management server (AACS server) 311; and the transmission data-use cryptographic key database 313, which is managed by the key management server (AACS server) 311. Note that the key management server (AACS server) 311, the cryptographic key (volume unique key (Kvu)) database 312, and the transmission data-use cryptographic key database 313 communicate with one another within the AACS secure area via secure communication channels that do not allow leakage.

It is assumed here that before start of the sequence of FIGS. 7 to 10, the following processes had been performed. That is, the service server 351 has transmitted the transmission data and the key generation request to the key management server (AACS server) 311; the key management server (AACS server) 311 has set the identifier (ID) for the transmission data, and generated the CPS unit key (title key) [Kt] for the transmission data ID and registered them in the transmission data-use cryptographic key database 313; the key management server (AACS server) 311 has generated the encrypted transmission data by encrypting the transmission data with the generated CPS unit key (title key) [Kt], and provided the encrypted transmission data and the transmission data identifier (transmission data ID) to the service server 351; and the service server 351 has stored the transmission data identifier (transmission data ID) and the encrypted transmission data in the encrypted transmission data storage database 352. These processes are performed each time new transmission data is generated in the service server 351.

Each step as shown in the sequence of FIGS. 7 to 10 will now be described below. First, at step S101, the user device (playback apparatus) 381, which has the medium (disk), such as the BD-ROM, mounted thereon, reads the BD-J program, which is a Java (registered trademark) program, from the disk or the playback apparatus, and executes the BD-J program to request the service server 351 to transmit data such as the trailer or the service data. Note that address information and user information necessary for transmission of this data request are acquired by the BD-J program. The address information and the user information are acquired from information previously stored in the disk or the playback apparatus.

At step S102, the service server 351, which has received the data request from the user device (playback apparatus) 381, requests the user device (playback apparatus) 381 to transmit a volume ID of the disk as the media information. As described above, the volume ID is the media information that is set as the identifier for a certain collection of media (volume), and is, for example, a unique identifier for a disk title (e.g., a movie title).

At step S103, the user device (playback apparatus) 381, which has received the request for the volume ID from the service server 351, reads the volume ID, which is the media information stored in the disk mounted on the user device (playback apparatus) 381, and further reads the CPS unit key file, and transmits them to the service server 351. Note that the service server 351 may store the CPS unit key file for each volume ID. In this case, the user device 381 may omit to transmit the CPS unit key file to the service server 351, and transmit only the volume ID to the service server 351.

At step S104, the service server 351, which has received the volume ID, or the volume ID and the CPS unit key file, from the user device (playback apparatus) 381, transmits a) the volume ID, b) the transmission data ID, c) the CPS unit identifier (CPS Unit Number) for the transmission data, and d) the CPS unit key file to the key management server (AACS server) 311.

Note that the CPS unit identifier (CPS Unit Number) for the transmission data is used also as location information about a location in the CPS unit key file at which the CPS unit key (title key) for the transmission data is to be stored. Also note that the CPS unit key file is transmitted by using the data received from the user device (playback apparatus) 381 or data stored in the service server 351 so as to be associated with the volume ID.

At steps S105 and S106, the key management server (AACS server) 311, which has received the above data a) to d) from the service server 351, searches the cryptographic key (volume unique key (Kvu)) database 312 based on the volume ID to acquire the volume unique key (Kvu) associated with the volume ID.

As described above with reference to FIG. 4, the cryptographic key (volume unique key (Kvu)) database 312 is a database in which the volume IDs and the associated volume unique keys [Kvu] are registered. The key management server (AACS server) 311 acquires, from the cryptographic key (volume unique key (Kvu)) database 312, the volume unique key (Kvu) that is associated with the volume ID received from the service server.

Further, at steps S107 and S108, the key management server (AACS server) 311 searches the transmission data-use cryptographic key database 313 based on the transmission data ID to acquire the transmission data-use cryptographic key (CPS unit key (title key)) associated with the transmission data ID.

As described above with reference to FIG. 5, the transmission data-use cryptographic key database 313 is a database in which the transmission data IDs and the associated CPS unit keys (title keys) [Ktn] are registered. The key management server (AACS server) 311 acquires, from the transmission data-use cryptographic key database 313, the CPS unit key (title key) that is associated with the transmission data ID received from the service server.

Next, at step S109, the key management server (AACS server) 311 encrypts the CPS unit key (title key) associated with the transmission data ID, which has been acquired from the transmission data-use cryptographic key database 313, with the volume unique key [Kvu] acquired from the cryptographic key (volume unique key (Kvu)) database 312, thereby generating "encrypted key data" Enc(Kvux, Kty). Enc(Kvux, Kty) denotes data obtained by encrypting the CPS unit key (title key) [Kty] with the volume unique key [Kvux].

Next, at step S110, the key management server (AACS server) 311 transmits the generated encrypted key data [Enc(Kvux, Kty)] to the service server.

Next, at step S111, the service server 351 searches the encrypted transmission data storage database 352 based on the transmission data ID, which has previously been received from the user device 381, to acquire the encrypted transmission data associated with the transmission data ID.

As described above with reference to FIG. 6, the encrypted transmission data storage database 352 is a database in which the transmission data IDs and the associated encrypted transmission data are registered. The service server 351 acquires, from the encrypted transmission data storage database 352, the encrypted transmission data that is associated with the transmission data ID which has previously been received from the user device 381. The transmission data is, for example, composed of the trailer, such as the advertising content, or the service data.

Next, at step S112, the service server 351 transmits the encrypted transmission data, which has been acquired from the encrypted transmission data storage database 352, and the encrypted key data [Enc(Kvux, Kty)], which has been received from the key management server (AACS server) 311, to the user device 381. Note that the encrypted key data [Enc(Kvux, Kty)] has been obtained by encrypting the CPS unit key (title key) associated with the transmission data ID with the volume unique key [Kvu]. Note that the CPS unit identifier (CPS Unit Number) associated with the transmission data may also be transmitted to the user device at this time. The CPS unit identifier (CPS Unit Number) is used as the location information about the location in the CPS unit key file at which the CPS unit key (title key) for the transmission data is to be stored.

At step S113, the user device 381, which has received the encrypted transmission data and the encrypted key data [Enc(Kvux, Kty)] from the service server 351, first performs a process of updating the CPS unit key file by storing the encrypted key data [Enc(Kvux, Kty)] in the CPS unit key file. More specifically, a current CPS unit key file read from the disk is stored in the local storage section, e.g., the hard disk, of the user device, and this CPS unit key file stored in the local storage section is subjected to the process of updating the CPS unit key file.

Figure 11:
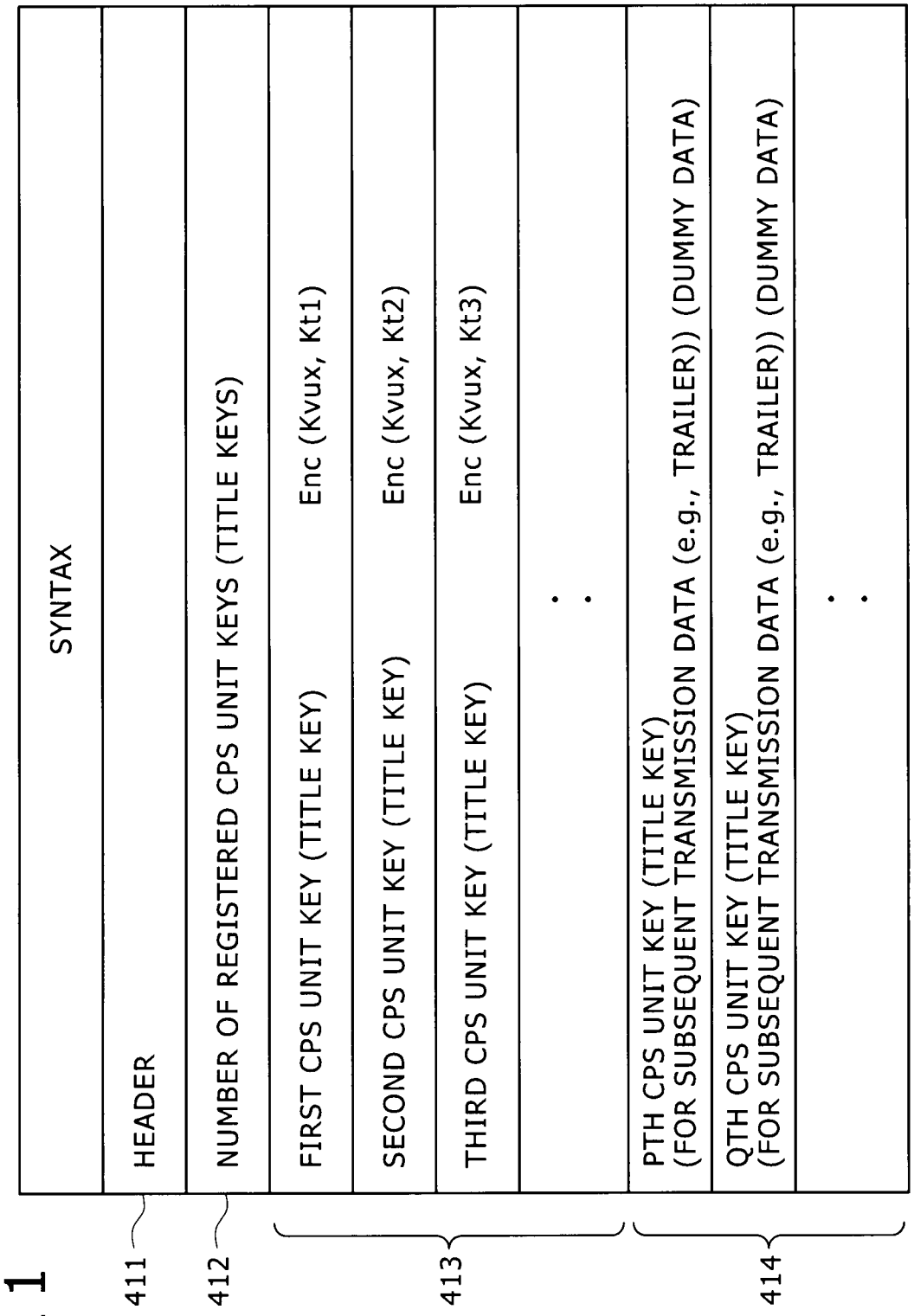
FIG. 11 is a diagram for describing an exemplary structure of a CPS unit key file.

FIG. 11 shows an exemplary structure of the CPS unit key file. As shown in FIG. 11, the CPS unit key file includes a header field 411, a field 412 for storing the number of CPS unit keys (title keys) registered in the file, a field 413 for storing the CPS unit keys (title keys), and a transmission data-use key registration field 414.

In the field 413 for storing the CPS unit keys (title keys), the CPS unit keys (title keys), which are used when decrypting the encrypted contents stored in the disk, are stored as data encrypted with the volume unique key [Kvu] associated with the volume ID corresponding to the disk, which is the volume unique key [Kvux] in this example.

The transmission data-use key registration field 414 is a field that is set for storing the encrypted key used for the transmission data, which has been received from the service server 351 as a result of the procedure described above with reference to the sequence diagrams of FIGS. 7 to 10. Initially, dummy data is stored in the transmission data-use key registration field 414, for example. Upon receipt of the encrypted key data [Enc(Kvux, Kty)] associated with the transmission data from the service server 351, the user device 381 stores the received encrypted key data in the transmission data-use key registration field 414 of the CPS unit key file as shown in FIG. 11, thereby performing the process of updating the CPS unit key file. The updated CPS unit key file is stored in the local storage section, such as the hard disk, of the user device.

Note that a location in the transmission data-use key registration field 414 at which the encrypted key data [Enc(Kvux, Kty)] associated with the transmission data is stored can be determined based on the CPS unit identifier (CPS Unit Number) provided from the service server 351 to the user device 381. As described above, the CPS unit identifier (CPS Unit Number) is used as the location information about the location in the CPS unit key file at which the CPS unit key (title key) associated with the transmission data is to be stored. Note that it may be so arranged that information about a correspondence between the transmission data and the key is generated by the user device, and this information is used.

Figure 10:
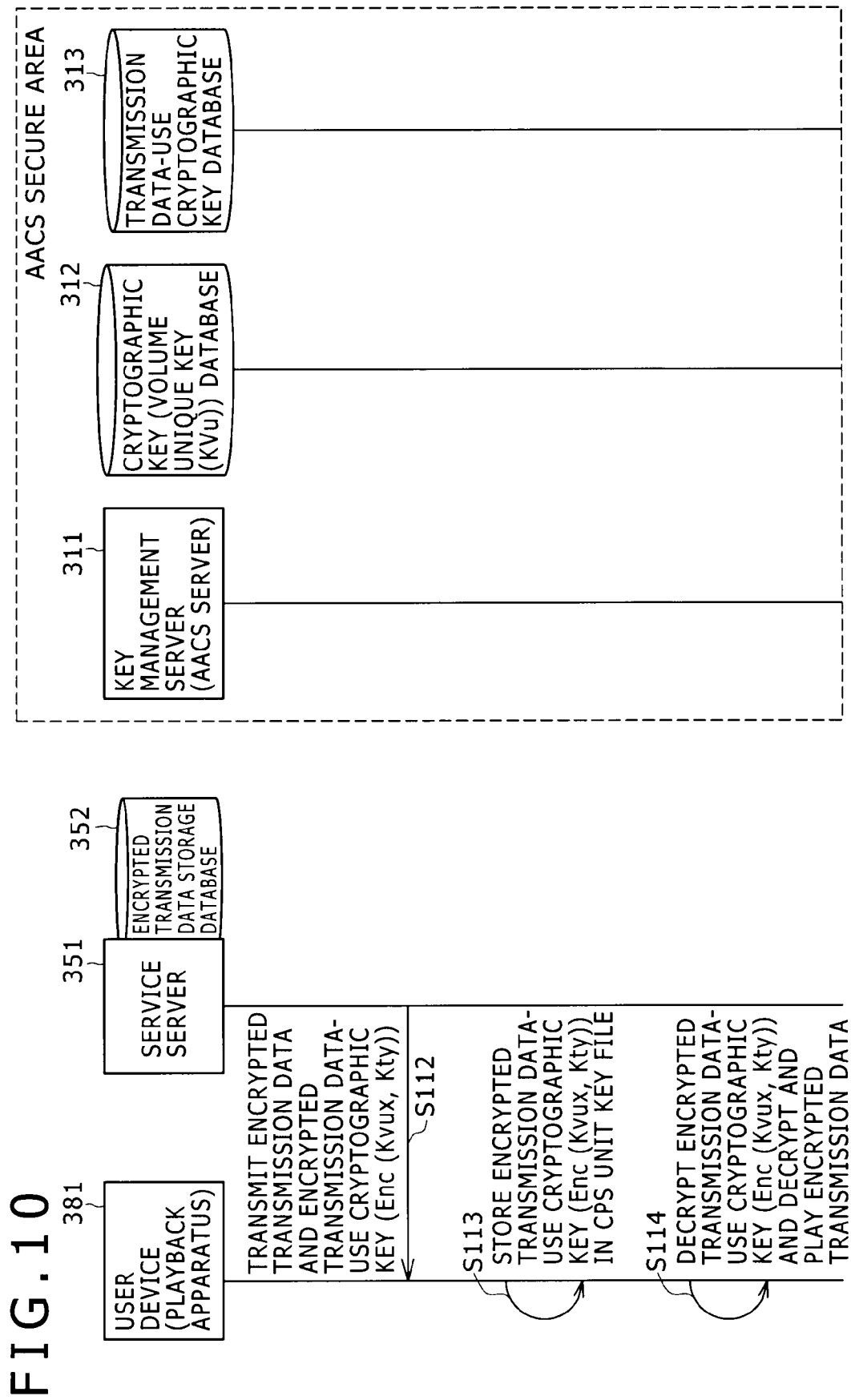

Returning to the sequence diagram of FIG. 10, at step S114, the user device 381, which has updated the CPS unit key file at step S113, uses the transmission data received from the service server 351. Note that the transmission data received from the service server 351 is stored in the local storage section, such as the hard disk, of the user device. When the transmission data is used, the encrypted key data [Enc(Kvux, Kty)] associated with the transmission data is read from the updated CPS unit key file stored in the local storage section, and this encrypted key is decrypted to acquire the CPS unit key (title key) associated with the transmission data, and the encrypted transmission data is decrypted therewith.

This procedure is the same as the key generation and the content decryption and playback as described above with reference to FIG. 1. In the case where the transmission data is played in conjunction with the playback of the content stored in the disk mounted on the user device, the keys for the content and the transmission data are generated and the content and the transmission data are decrypted therewith, and a virtual file system (VFS) which integrates the transmission data and the disk-stored content is set for the playback process. The playback process based on the VFS enables playback in a manner similar to that of the process of playing data on a single medium.

According to the sequence of FIGS. 7 to 10, for one type of transmission data, the service server 351 needs to store only one piece of encrypted transmission data, encrypted with a single CPS unit key (title key). Specifically, there is that type of transmission data, such as the trailer, advertising data, or the service data, which is not associated with a particular content title but shared by multiple titles. For that transmission data, the CPS unit key (title key) is set, and only one piece of encrypted transmission data, obtained by encrypting the transmission data with this CPS unit key (title key), needs to be stored in the encrypted transmission data storage database.

Therefore, the service server does not need to generate and store multiple pieces of encrypted transmission data for the same transmission data, applying different cryptographic keys (CPS unit keys) for different titles. This results in increased efficiency in processing and a reduction in storage space.

In the sequence of FIGS. 7 to 10, the service server 351 provides the encrypted data of the CPS unit key (title key) associated with the transmission data to the user device 381. Note, however, that it may be so arranged that the service server 351 writes the CPS unit key (title key) associated with the transmission data to the current CPS unit key file to generate the updated CPS unit key file, and provides the updated CPS unit key file to the user device 381.

Also note that the updating of the CPS unit key file may be performed by the key management server (AACS server) 311. In this case, the key management server (AACS server) 311 writes the CPS unit key (title key) associated with the transmission data to the current CPS unit key file to generate the updated CPS unit key file, and provides the updated CPS unit key file to the service server 351, and the service server 351 stores the updated CPS unit key file received from the key management server (AACS server) 311, and provides the updated CPS unit key file to the user device 381.

[4. Structures of and Processes by Devices]

Figure 12:
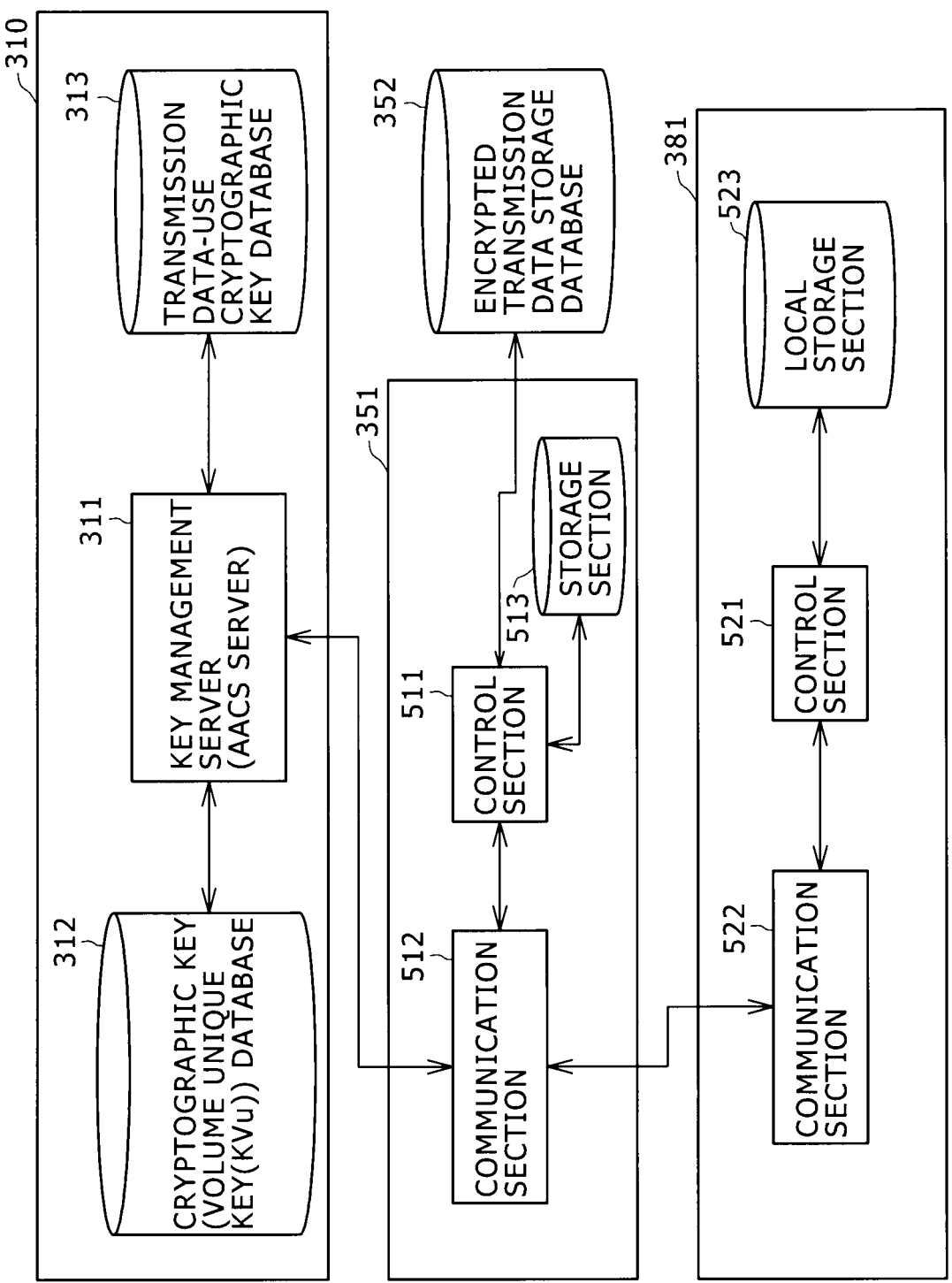
FIG. 12 is a diagram for describing the structures of and processes by devices that form the content providing system according to one embodiment of the present invention.

Next, structures of and processes by the service server 351 and the user device 381 will now be described collectively below with reference to FIG. 12. The service server 351 is configured as an information processing apparatus that transmits data in response to receipt of the media information, i.e., the volume ID, from the user device 381. While, in FIG. 12, the service server 351 is shown as having only a control section 511, a communication section 512, and a storage section 513, the service server 351 also has such other hardware components as a common PC or server has. The service server 351 performs the process of acquiring the encrypted transmission data from the encrypted transmission data storage database 352, which stores the transmission data identifier and the encrypted transmission data such that the transmission data identifier and the encrypted transmission data are associated with each other, and providing the acquired encrypted transmission data to the user device 381.

Upon receipt of the media information, i.e., the volume ID, which corresponds to the medium (disk) mounted on the user device 381 from the user device 381 via the communication section 512, the control section 511 transmits the received volume ID and the transmission data identifier to the key management server 311, and acquires, from the key management server 311 via the communication section 512, the encrypted unit key (title key), which has been obtained by encrypting the unit key used when encrypting the transmission data.

Further, the control section 511 performs the process of transmitting the encrypted unit key (title key) acquired from the key management server 311 and the encrypted transmission data acquired from the encrypted transmission data storage database 352 to the user device 381 via the communication section 512. Note that the data transmitted to the user device 381 may include the unit identifier used as the information about the location in the CPS unit key file, which is the file in which the unit key is to be stored, at which the key is to be stored.

Note that the encrypted unit key is the data, Enc(Kvux, Kty), obtained by encrypting the unit key with the volume unique key [Kvu], i.e., the cryptographic key which is set so as to be associated with the volume ID as the media information. The control section 511 performs the process of acquiring the encrypted unit key Enc(Kvux, Kty) from the key management server 311, and transmitting it to the user device 381.

Note that the storage section 513 of the service server 351 may store the unit key file that is registered so as to be associated with the volume ID as the media information. In this case, the control section 511 stores the encrypted CPS unit key associated with the transmission data as acquired from the key management server 311 in the CPS unit key file stored in the storage section 513, thereby updating the CPS unit key file, and transmits the updated CPS unit key file to the user device 381.

The user device 381 receives, from the service server 351 via a communication section 522, the encrypted CPS unit key or the updated CPS unit key file along with the encrypted transmission data. A control section 521 of the user device 381 stores the encrypted transmission data in a local storage section 523, and updates the CPS unit key file. In the case where the updated CPS unit key file has been received from the service server 351, this updated CPS unit key file is stored in the local storage section 523.

As described above with reference to FIG. 11, in the case where the encrypted unit key Enc(Kvux, Kty), which has been obtained by encrypting the unit key associated with the transmission data with the volume unique key [Kvu], has been received from the service server 351, the current CPS unit key file is read from the local storage section 523 or the mounted disk, and the received encrypted key data is stored in the transmission data-use key registration field 414 of the CPS unit key file as shown in FIG. 11.

The CPS unit key file that has been updated by overwriting of the encrypted data Enc(Kvux, Kty) associated with the transmission data is stored in the local storage section 523 of the user device 381. Note that, as described above, the location at which the encrypted key data [Enc(Kvux, Kty)] associated with the transmission data is stored can be determined based on the CPS unit identifier (CPS Unit Number) provided from the service server 351 to the user device 381.

While one specific embodiment of the present invention has been described in detail above, the foregoing description of the embodiment is in all modes illustrative and not restrictive. It will be understood by those skilled in the art that various modifications, combinations, sub-combinations and alterations may occur depending on design requirements and other factors insofar as they are within the scope of the appended claims or the equivalents thereof.

For example, various databases are used in the present invention. Note, however, that the databases do not need to be implemented by an application program. It may be so arranged that the ID is set as a directory name and the associated file is contained in that directory.

Also note that, in the above-described embodiment, the key management server and the service server are formed by separate hardware units. However, as long as security is ensured, the key management server and the service server may be formed by separate software modules on the same hardware unit.

Also note that the series of processes described in this specification may be performed by hardware or software or a combination of the both. In the case where the series of processes are performed by the software, a program storing the processing sequence may be installed on a memory in a computer having a dedicated hardware structure to be executed, or the program may be installed on a general-purpose computer capable of performing various processes to be executed. For example, the program may be stored in a storage medium beforehand. The program may be installed into the computer from the storage medium. Alternatively, the program may be received via a network, such as a local area network (LAN) or the Internet, and installed into an internal storage medium, such as a hard disk.

Note that the various processes described in this specification may be performed chronologically in an order as described above. Alternatively, some of the processes may be performed in parallel or independently as necessary or depending on processing capability of the device that performs the processes.

As described above, according to one embodiment of the present invention, in a system in which the service server provides to the user device the transmission data corresponding to the medium mounted on the user device, the service server needs to store only one piece of encrypted transmission data, encrypted with a single CPS unit key (title key), for one type of transmission data. That is, the service server does not need to store, for the same transmission data, multiple pieces of encrypted transmission data, encrypted with different cryptographic keys for different titles corresponding to the volume IDs, which are the media information. With respect to that type of transmission data, such as the trailer, the advertising data, or the service data, which does not correspond to a particular content title but is shared by multiple titles, it is possible to set the CPS unit key (title key) for the transmission data, store the encrypted transmission data, which is obtained by encrypting the transmission data with that CPS unit key (title key), and provide the encrypted transmission data to the user device. The service server does not need to generate and store multiple pieces of encrypted transmission data for the same transmission data by encrypting the transmission data with different cryptographic keys (CPS unit keys) for different titles. Thus, increased efficiency in processing and a reduction in storage space are achieved.

What is claimed is:

1. An information processing apparatus that serves as a server that performs data transmission in response to receipt of media information from a user device, the apparatus comprising:
    an encrypted transmission data storage database that stores a subcontent identifier and encrypted subcontent such that the subcontent identifier and the encrypted subcontent are associated with each other; and
    a control section, including a hardware processor, configured to acquire, from a key management server, an encrypted unit key obtained by encrypting a unit key that is used to encrypt the subcontent, and transmit the acquired encrypted unit key and the encrypted subcontent to the user device,
    wherein the user device plays back the subcontent in conjunction with another content having a different unit key than the unit key of the subcontent such that the subcontent is played back before, during, or after play back of the another content.

2. The information processing apparatus according to claim 1, wherein the encrypted unit key is data that is obtained by encrypting the unit key with a cryptographic key that is set for the media information, and said control section is configured to acquire, from the key management server, the encrypted unit key obtained by encrypting the unit key with the cryptographic key that is set for the media information.

3. The information processing apparatus according to claim 1, wherein said control section is configured to transmit the media information and the subcontent identifier to the key management server, and acquire the encrypted unit key from the key management server, the unit key being stored by the key management server so as to be associated with the subcontent identifier, the encrypted unit key being data obtained by encrypting the unit key with a cryptographic key that is stored so as to be associated with the media information.

4. The information processing apparatus according to claim 1, wherein said control section is further configured to transmit, to the user device, a unit identifier that is used as information about a location in a unit key file at which the unit key is stored, the unit key file being a file for storing the unit key.

5. The information processing apparatus according to claim 1, further comprising a storage section configured to store a unit key file that is registered so as to be associated with the media information, wherein said control section is configured to update the unit key file by storing the encrypted unit key acquired from the key management server in the unit key file, and transmit the updated unit key file to the user device.

6. A content providing system, comprising:
a user device configured to transmit media information to a service server, and receive subcontent from said service server; said service server configured to transmit the subcontent in response to receipt of the media information from said user device, the user device playing back the subcontent in conjunction with another content having a different unit key than a unit key of the subcontent such that the subcontent is played back before, during, or after play back of the another content; and
a key management server, including a hardware processor, configured to manage the unit key that is used to encrypt the subcontent, wherein said service server receives the media information from said user device, and transmits the media information and a subcontent identifier to said key management server, said key management server encrypts a unit key stored so as to be associated with the subcontent identifier with a cryptographic key stored so as to be associated with the media information, and transmits the generated encrypted unit key to said service server, and said service server transmits the encrypted unit key acquired from said key management server and the encrypted subcontent to said user device.

7. The content providing system according to claim 6, wherein said user device stores the encrypted unit key received from said service server in a unit key file held by said user device to update the unit key file, and stores the updated unit key file in a storage section.

8. The content providing system according to claim 6, wherein said key management server includes a subcontent-use cryptographic key database that stores the subcontent identifier and the unit key such that the subcontent identifier and the unit key are associated with each other, the unit key being set for the subcontent, and a cryptographic key database that stores the media information and the cryptographic key set for the media information such that the media information and the cryptographic key are associated with each other, and said key management server searches the subcontent-use cryptographic key database to acquire the unit key stored so as to be associated with the subcontent identifier, and searches the cryptographic key database to acquire the cryptographic key stored so as to be associated with the media information.

9. An information processing method employed by an information processing apparatus that serves as a server that transmits subcontent in response to receipt of media information from a user device, the method comprising:
acquiring, from a key management server, an encrypted unit key obtained by encrypting a unit key that is used to encrypt the subcontent, in response to the receipt of the media information from the user device; and
acquiring, from an encrypted subcontent storage database that stores a subcontent identifier and the encrypted subcontent such that the subcontent identifier and the encrypted subcontent are associated with each other, the encrypted subcontent, and transmitting the acquired encrypted unit key and the encrypted subcontent to the user device,
wherein the user device plays back the subcontent in conjunction with another content having a different unit key than a unit key of the subcontent such that the subcontent is played back before, during, or after play back of the another content.

10. The method according to claim 9, wherein the encrypted unit key is data that is obtained by encrypting the unit key with a cryptographic key that is set for the media information, and in said acquiring an encrypted unit key the encrypted unit key obtained by encrypting the unit key with the cryptographic key that is set for the media information is acquired from the key management server.

11. The method according to claim 9, wherein said acquiring an encrypted unit key includes:
transmitting the media information and the subcontent identifier to the key management server; and
acquiring the encrypted unit key from the key management server, the unit key being stored by the key management server so as to be associated with the subcontent identifier, the encrypted unit key being data obtained by encrypting the unit key with a cryptographic key that is stored so as to be associated with the media information.

12. The method according to claim 9, wherein said acquiring the encrypted transmission data includes the step of transmitting, to the user device, a unit identifier that is used as information about a location in a unit key file at which the unit key is stored, the unit key file being a file for storing the unit key.

13. The method according to claim 9, wherein the information processing apparatus includes a storage section configured to store a unit key file that is registered so as to be associated with the media information, and the method further comprises the step of the control section updating the unit key file by storing the encrypted unit key acquired from the key management server in the unit key file, and transmitting the updated unit key file to the user device.

14. A non-transitory computer readable medium encoded with a computer program that causes an information processing apparatus that serves as a server that transmits subcontent in response to receipt of media information from a user device to perform information processing, the program causing the information processing apparatus to perform a method comprising:
acquiring by a control section, from a key management server, an encrypted unit key obtained by encrypting a unit key that is used to encrypt the subcontent, in response to the receipt of the media information from the user device; and acquiring by the control section, from an encrypted subcontent storage database that stores a subcontent identifier and the encrypted subcontent such that the subcontent identifier and the encrypted subcontent are associated with each other, the encrypted subcontent, and transmit the acquired encrypted unit key and the encrypted subcontent to the user device, wherein the user device plays back the subcontent in conjunction with another content having a different unit key than the unit key of the subcontent such that the subcontent is played back before, during, or after play back of the another content.

15. An information processing apparatus that serves as a key delivery server that delivers a key to a service server that transmits subcontent in response to receipt of media information from a user device, the apparatus comprising:

a cryptographic key database that stores the media information and a cryptographic key that is set for the media information such that the media information and the cryptographic key are associated with each other;

a subcontent-use cryptographic key database that stores a subcontent identifier and a unit key such that the subcontent identifier and the unit key are associated with each other; and a control section configured to acquire, from said cryptographic key database, the cryptographic key that is set for the media information and associated with the media information received from the service server, acquire the unit key associated with the subcontent identifier received from the service server from said subcontent-use cryptographic key database, encrypt the acquired unit key with the cryptographic key that is set so as to be associated with the acquired media information, and transmit the encrypted unit key to the service server, wherein a user device plays back the transmission data in conjunction with another content having a different unit key than a unit key of the subcontent such that the subcontent is played back before, during, or after play back of the another content.

16. The content providing system according to claim 6, wherein said user device plays back the subcontent in conjunction with a plurality of content each having a different unit key than a unit key of the subcontent and each of the plurality of content having a unit key different than any of an other of the plurality of content.

17. The content providing system according to claim 6, wherein the subcontent is an advertisement, and said user device plays back the advertisement in conjunction with a plurality of content each having a different unit key than a unit key of the advertisement and each of the plurality of content having a unit key different than any of an other of the plurality of content.

* * * * *